Figure 1:
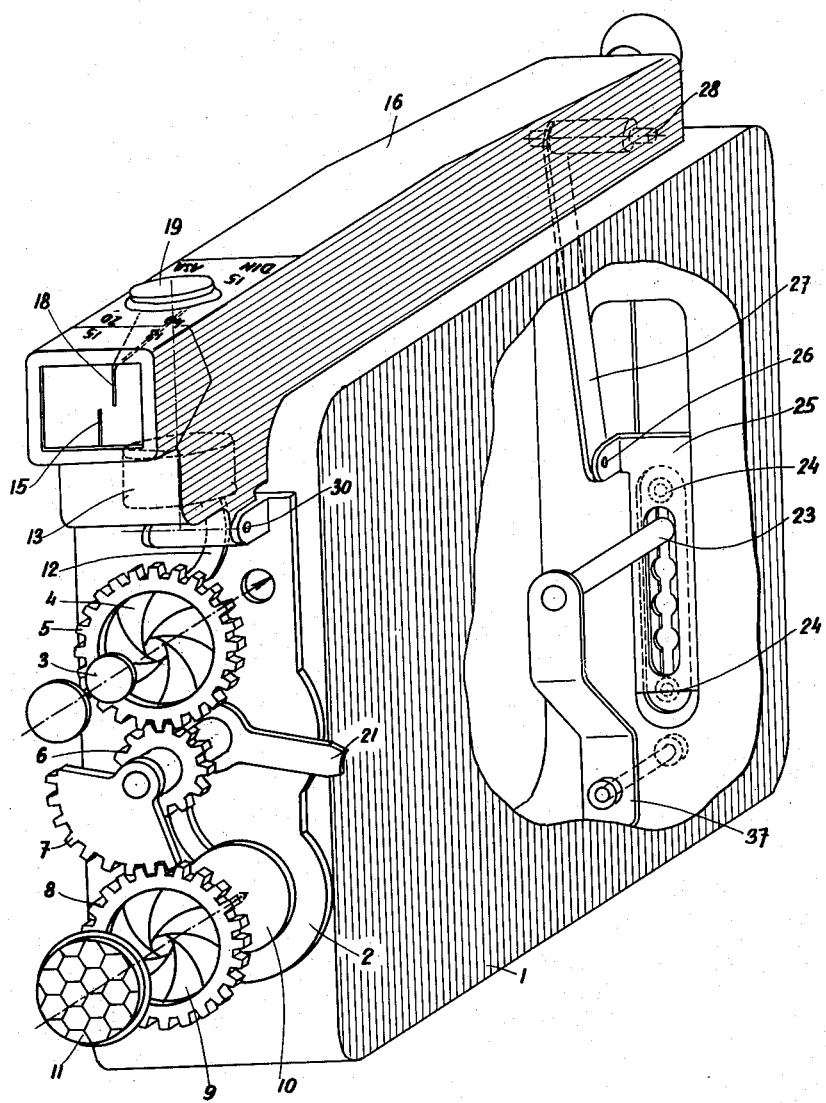

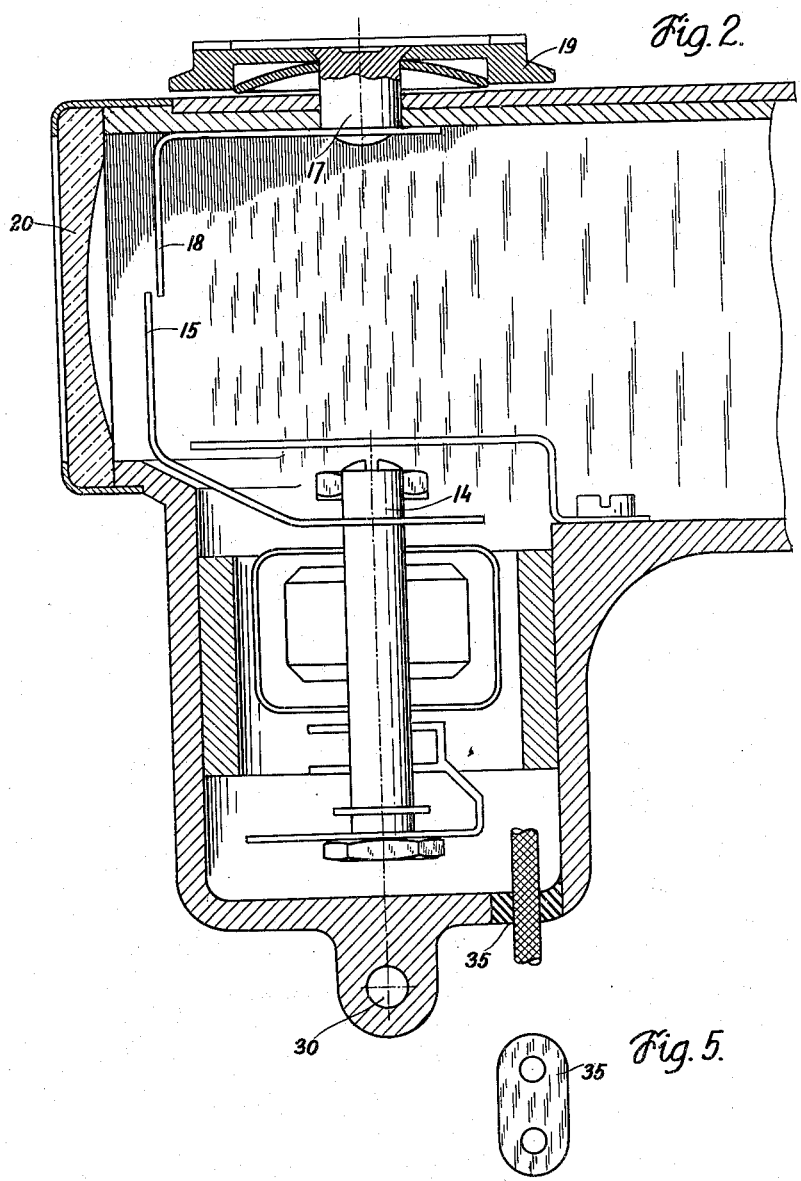

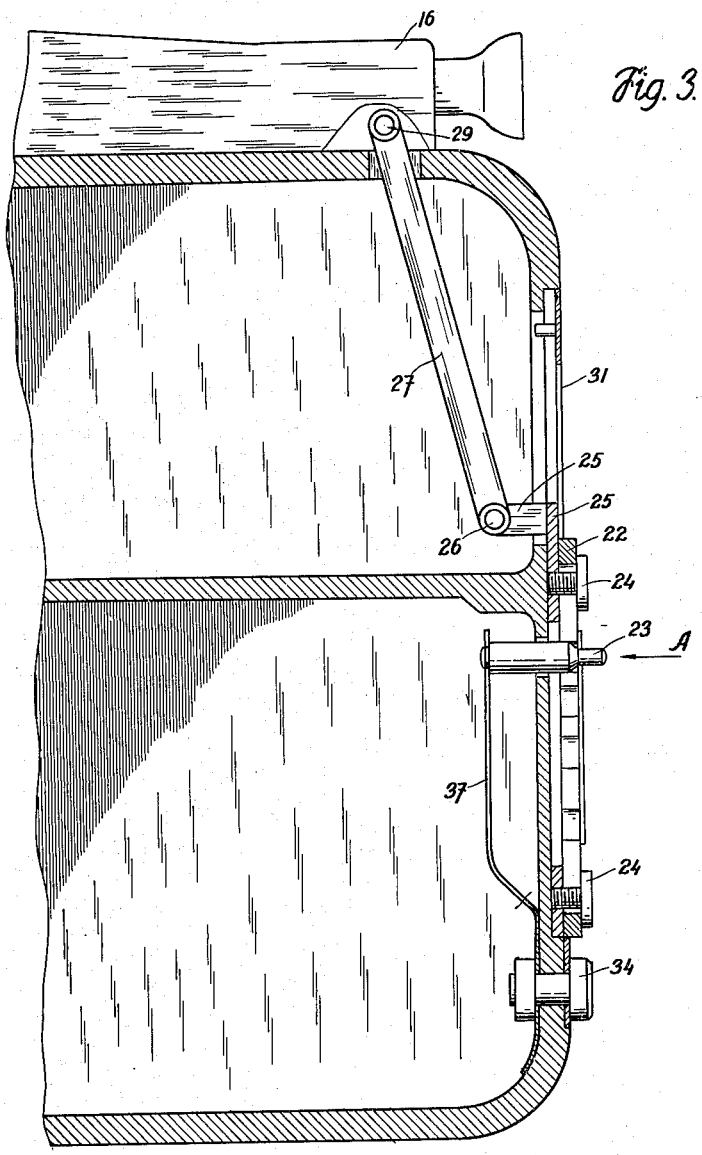

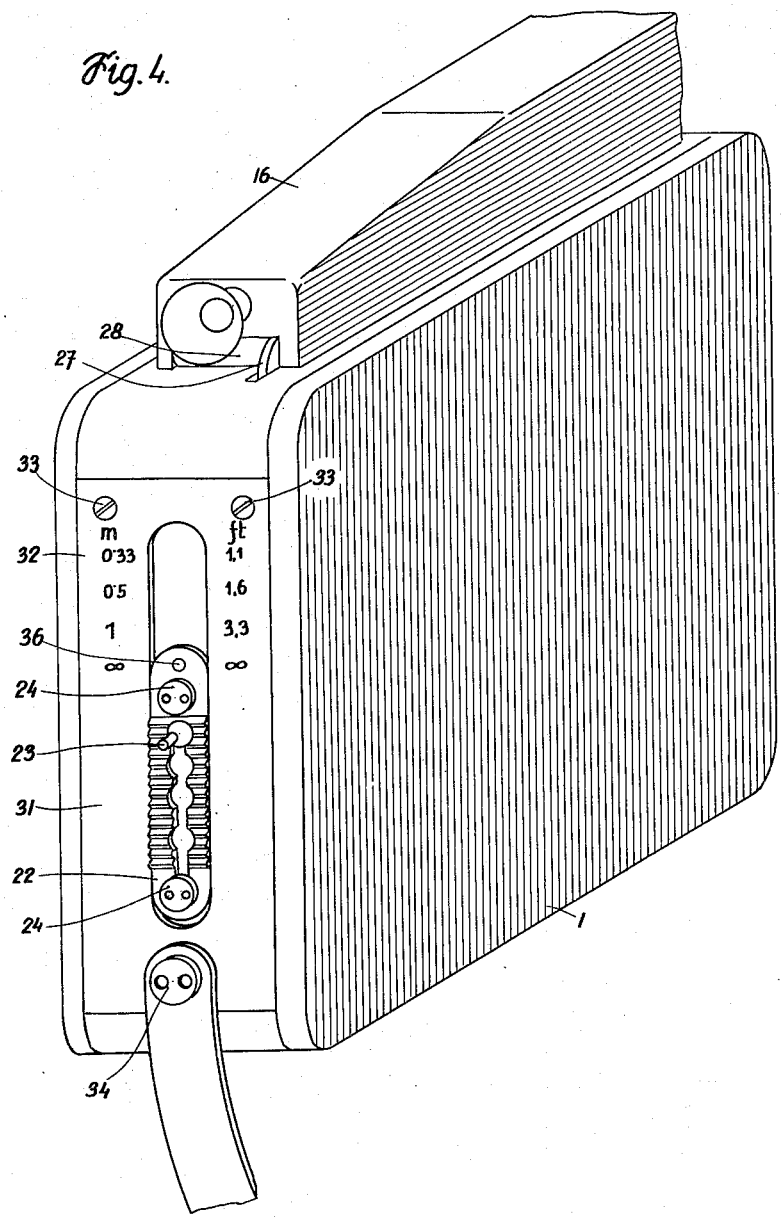

United States Patent Office 3,000,283
Patented Sept. 19, 1961

3,000,283
PHOTOELECTRIC EXPOSIMETER FOR PHOTOGRAPHIC OR MOVING-PICTURE PICK-UP CAMERA
Bedřich Kafka, Prerov, Czechoslovakia, assignor to Meopta Prerov, narodni podnik, Prerov, Czechoslovakia
Filed Dec. 8, 1959, Ser. No. 858,116
Claims priority, application Czechoslovakia Dec. 10, 1958
3 Claims. (Cl. 95—10)

The invention relates to photoelectric exposimeters with pointer visible in the field of view of the *dioptric* view finder which is located at the top of the photographic or moving-picture pick-up camera.

Some photographic or moving-picture cameras are known to have photographic cells with iris-diaphragms whereby the iris diaphragm influencing the incident light is coupled as the objective diaphragm by means of a control mechanism (British Pat. No. 429,676). Equally known are moving-picture cameras having the galvanometer pointer arranged in the field of view of the view finder whereby the diaphragm of the objective and that of the photoelectric cell are adjusted according to the indications of the galvanometer.

The present invention aims to improve apparatus of this kind. The photoelectric exposimeter is fitted with a pointer visible in the field of view of the dioptric view finder which is placed at the top of the photographic or moving-picture camera and is characterized in that the view finder is designed as independent unit pivoted on a horizontal bolt and that the galvanometer shaft, arranged in an axis approximately passing through the center of curvature of the front lens of the view finder, is coaxial with the pivot of an index serving for the adjustment of lighting values, whereby the galvanometer shaft is placed at right angles to the bolt on which the view finder is pivoted. The invention is also characterized by an adjustable slider with index, displaceable at right angles to the optical axis of the objective located upon the camera casing whereby the slider is coupled by a rod with a joint pin of the view finder. An advantageous feature of this exposimeter consists in that no error occurs when the galvanometer pointer is brought to coincidence with the adjustable index. Due to the location of the galvanometer center of gravity near the pivot bolt of the view finder, there is no difficulty in deflecting the latter. The vertical arrangement of the galvanometer spindle results in a reduction of its bearing friction and essential improvement of its action and balance. By means of a simple modification, it is possible to use a photoelectric exposimeter of this kind as an attachable adaptor. The view finder permits ancillary optical lenses to be used in accordance with the front lens used on the objective. The location of the scale of lighting valves upon the upper wall of the view finder facilitates the checking of adjusted values.

The invention is illustrated upon the accompanying drawings. FIG. 1 is a perspective view of the exposimeter and the deflectable view finder; FIG. 2 is a sectional view of the galvanometer with pointer and of the adjustable index; FIG. 3 is a sectional view of the deflecting mechanism; FIG. 4 is a perspective view of the rear wall of the camera showing the adjustable slider and the distance scale; and FIG. 5 shows an insert member of the apparatus of FIG. 2 in plan view.

A plate 2 carrying the exposimeter is fastened to the camera casing 1. The pick-up objective 3 is fitted with an iris diaphragm 4 which is operated by a gear 5 engaged with a tooth 6 and the latter is connected with a toothed segment 7. The segment 7 meshes with a gear 8 which serves for rotating the iris diaphragm 9 located in front of the fotoelectric cell. The light rays pass through a honeycomb system of lenses 11 and through the iris diaphragm 9 and fall upon the photoelectric cell 10. The electric current thus originated is lead to the galvanometer 13 through two electric conductors arranged outside the camera casing, and deflects the galvanometer pointer 15 which is visible within the field of view of the view finder 16. The galvanometer shaft 14 is arranged vertically and coaxially to the pivot pin 17 of the index 18 which is adjustable in relation to the scale of lighting values. The index 18 is rotated, by a knob 19, in relation to the scale 19a designed for one picture frequency and for four degrees of film sensitiveness. The rotation of the index 18 and of the pointer 15 is done approximately about the center of curvature of the front lens 20 of the view finder. After adjusting the required film sensitiveness on the scale 19a, one turns the control lever 21—while continuously observing the picked-up object—until the pointer 15 coincides with the index 18 so as to adjust the correct value of the diaphragm number. When taking shots from a distance shorter than 1.5 m., one deflects the view finder. Considering the length of the latter, its deflection is operated by means of a special slider 22. For this purpose, one presses the button 23 in the direction A thus pushing the thicker portion of the button out of its retention hole. The slider 22 contains a series of such retention holes. By two screws 24, the slider is fastened to a back member 25 which carries a pin 26 which is connected, by a rod 27, with a joint pin 29 mounted upon the case of the view finder 16. The view finder case, pivoted on the bolt 30 can be lifted (deflected) by displacing the slider 22. The slider moves along a plate 31 which carries a scale indicating, after the focusing of the apparatus, the distance of the object, according to which the position of the view finder is adjusted so as to remove the parallax of the image. The plate 31 is fastened by two screws 33 and also by the screw 34 of the carrying strap. A flat spring 37 secures the view finder in its individual positions. The two screws 24 serve for setting the position of the view finder. They connect the slider 22 to the back member 25 and are tightened, after setting the view finder, to a hyperfocal distance, so that the slider 22 and the back member 25 form an integral piece. The distance scale is fixed, and the index 36 is marked only after the setting of the view finder. The galvanometer moves together with the view finder, when the latter is deflected. During this motion, the electric supply wires make a motion parallel to that of the galvanometer within its space. Their shortening or elongation occurs on the free length of the wires i.e. between the elastic inserted piece 35 and the photoelectric cell 10. The elastic insert 35 enables the wires to move parallel with the galvanometer and prevents them from being bent at the point of entering the galvanometer.

I claim:
1. In combination with a camera including a casing having front, back and top walls, and an objective lens with an adjustable diaphragm mounted on said front wall; an exposure meter including a photoelectric cell with an adjustable diaphragm and manually operable means for simultaneously adjusting the diaphragms associated with the objective lens and photoelectric cell, respectively, said photoelectric cell, the associated diaphragm and said manually operable means also being mounted on said front wall, a galvanometer having a shaft with an indicating pointer thereon and being operated by said photoelectric cell and an index pointer manually turnable about an axis coaxial with said shaft; and a view finder including an elongated casing extending along said top wall of the camera casing and an objective lens at the front end of said elongated casing, means pivotally mounting said front end of the view finder casing on said front wall of the camera casing for swinging relative to the latter about a horizontal, laterally extending axis, said galvanometer being disposed in the front end portion of said view finder casing with said shaft extending vertically and having its axis extending through the center of curvature of said objective lens of the view finder, said indicating and index pointers being interposed in the field of view of said view finder, and manually actuable means for swinging said view finder casing relative to said camera casing so as to correct for parallax between the objective lenses of the view finder and camera.

2. The combination as in claim 1; wherein said view finder casing has a downwardly projecting portion at its front end housing said galvanometer and extending in front of said front wall of the camera casing; and wherein said horizontal, laterally extending axis is disposed immediately below said downwardly projecting portion of the view finder casing so as to be close to the center of gravity of said galvanometer.

3. The combination as in claim 1; wherein said manually actuable means for swinging the view finder casing relative to the camera casing includes a slider movable vertically along said back wall of the camera casing, and a link-rod pivotally connected, at its opposite ends, to said slider and to the view finder casing.

References Cited in the file of this patent

UNITED STATES PATENTS

| | | |
|---|---|---|
| 1,397,231 | Patterson | Nov. 15, 1921 |
| 1,796,725 | Ross | Mar. 17, 1931 |
| 2,242,043 | Sanger | May 13, 1941 |
| 2,250,898 | Tonnies | July 29, 1941 |
| 2,300,245 | Bell | Oct. 27, 1942 |
| 2,640,777 | Fachman | June 2, 1953 |
| 2,902,968 | Barthruff | Sept. 8, 1959 |